May 24, 1966 W. J. COX 3,252,404
MEAT FRYING COVER

Filed Oct. 16, 1964 2 Sheets-Sheet 1

INVENTOR.
WILMA J. COX

BY Jerome R. Cox
ATTORNEY

May 24, 1966 W. J. COX 3,252,404
MEAT FRYING COVER

Filed Oct. 16, 1964 2 Sheets-Sheet 2

INVENTOR.
WILMA J. COX

BY Jerome R. Cox
ATTORNEY

United States Patent Office
3,252,404
Patented May 24, 1966

3,252,404
MEAT FRYING COVER
Wilma J. Cox, 135 Columbus Road, Athens, Ohio
Filed Oct. 16, 1964, Ser. No. 404,337
5 Claims. (Cl. 99—349)

This invention deals with a meat frying cover assembly to be placed over frying meat and, more particularly, deals with a handle assembly for such a cover.

Frying meat presents a problem in that meat, particularly bacon, tends to curl as it fries. Workers in the art have solved this problem to a considerable extent by providing a flat cover, sometimes transparent, which is laid on the meat during the frying process. Thus Cannon in U.S. Patent No. 1,624,214; Isaacson in U.S. Patent No. 1,783,792; Wendt in U.S. Patent No. 2,536,246; and Layton et al. in U.S. Patent No. 2,751,840 describe such covers.

One of the problems encountered in the meat frying covers of the art arises from the fact that, since one cannot easily pick up a hot flat plate, a handle must be provided. Attempts to solve this problem have led to the use of rather long handle assemblies, double plates with hinges, handle assemblies which clamp under the edges of the plate, and covers which are hinged on the frying pan itself. These assemblies, since they involve hinges, springs, or clamps have proved difficult to clean after use. This situation has led to a demand for a meat frying cover which can be handled easily when hot and which is of a simple unitary structure adaptable for easy cleaning after use.

The simplest unitary cover structure which can be pictured is a flat glass plate with an integrally molded glass handle. Glass handles which are molded with a glass cover as an integral part thereof have proved unsatisfactory, partly because they become hot during use and are therefore difficult to grasp and, partly, because the greatly increased thickness of glass at one point on the cover presents a strain on the glass at that point during expansion of the glass during the heating thereof. A third factor in the use of such covers which limits the effective life thereof arises from the fact that housewives usually press down quite firmly on the handle from time to time as the frying is in progress. This act tends to add an additional strain on the glass at its weakest point.

I have attempted to use, as a handle assembly, a heat resistant handle which is secured to the glass plate by a screw inserted into the handle from the bottom of the plate through a hole in the plate. However, subjecting such an assembly to meat frying temperatures causes the screw to expand which, in turn, causes the handle to move slightly away from the plate. Any manipulation of the handle at such time often causes, or at least allows, the handle to move in a horizontal plane relative to the plate. Such a handle assembly is also subject to the deficiency mentioned above; that is, that downward pressure adds additional strain on the glass at its weakest point.

Objects

It is an object of this invention to provide an improved meat frying cover which is more convenient to use and which has a longer life.

It is a further object of the invention to provide a meat frying cover which is easy to clean after use and which does not comprise parts which require assembly or disassembly either before or after use.

It is a further object to provide a heat resisting handle assembly for such a cover which can be handled conveniently with the bare hands of the operator during the frying process.

It is a further object to provide a handle assembly which is not unduly strained by the expansion of the glass cover during the frying process.

It is a furher object to provide a handle assembly which distributes any downward force on the handle over a suitably wide area of the plate.

I have now found that the foregoing and related objects can be secured in a meat frying assembly comprising (1) a flat heat resistant glass plate, said plate being provided with at least one hole therein; (2) a grommet inserted in the bottom side of each said plate hole; (3) a non-heat conducting handle positioned on the top side of said plate, and provided with a screw tapped hole concentric with each plate hole; (4) a non-heat conducting annular spacer positioned at each plate hole, each said spacer being concave on its under side, positioned concentrically with a plate hole, and touching said plate only at the peripheral edge of said spacer; (5) a resilient washer positioned at each plate hole, said washer being of substantially smaller diameter than said spacer, being positioned between said spacer and said plate and in the concavity of the spacer, and the thickness of said washer being substantially equal to the depth of the concavity of said spacer; and (6) a screw inserted in said assembly from the bottom side of each plate hole and penetrating a grommet, a hole in the plate, a washer, and being threadedly engaged with said handle.

The invention can be better understood by reference to the accompanying drawings which illustrate a preferred embodiment of my invention.

Figure 1:
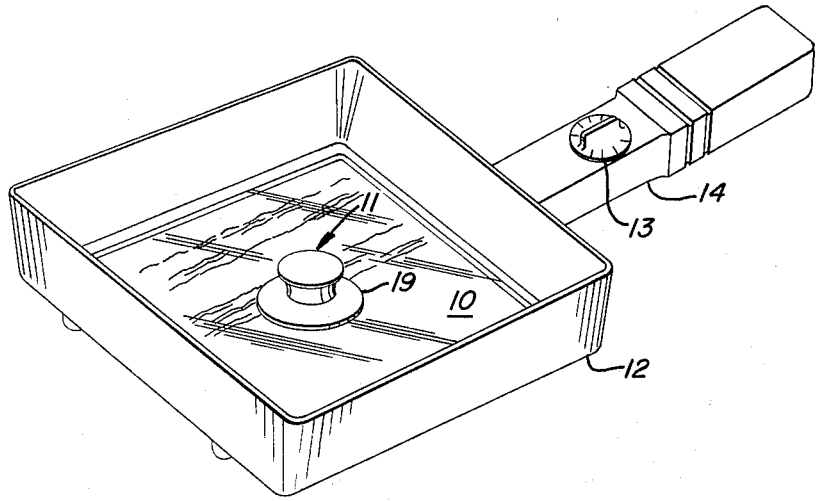
FIG. 1 is a perspective view of the meat frying cover of the invention in use in a square electric frying pan.
Figure 2:
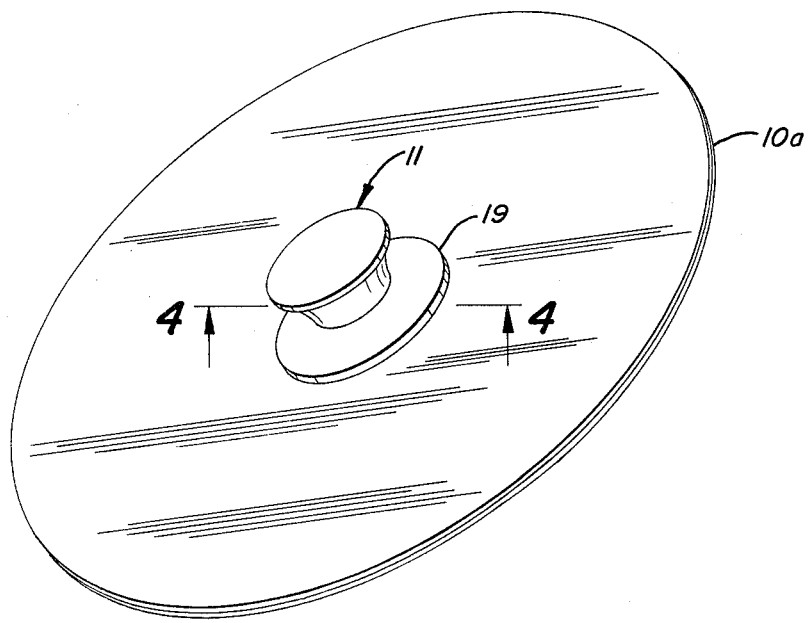
FIG. 2 is a perspective view of a circular cover embodying features of the invention.

Referring more particularly to the drawings a transparent glass cover 10, fitted with a handle assembly indicated generally by 11, is adapted to fit inside a frying pan 12. The latter, as illustrated, is electric and is provided with a current regulating switch 13 positioned in handle 14. The frying pan 12 need not be electric but may be heated by any type of heat. Further the pan 12 may be round, requiring a cover 10a as shown in FIG. 2, or may be square, requiring a cover 10 as shown in FIGS. 1 and 3.

Figure 4:
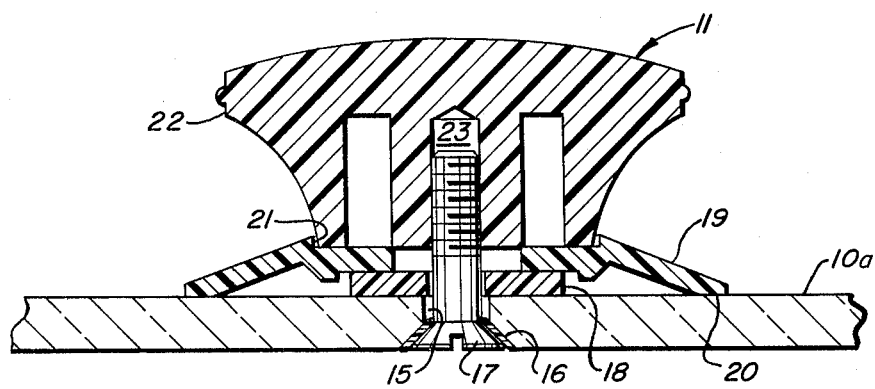
FIG. 4 is a sectional view of the handle of the invention taken along the line 4—4 of FIG. 2.

Referring specifically to FIG. 4, the glass plate 10a is provided with a hole 15 into the bottom of which is inserted a grommet 16 and a screw 17. A washer 18 made of a resilient material such as neoprene or the like is positioned on top of the plate 10 and concentrically with the hole 15. An annular non-heat conducting spacer 19 is positioned concentrically with the hole 15 and the washer 18. The spacer 19, which can be made of hard rubber, a Bakelite plastic or the like; is concave on its under side, the depth of the concavity being substantially equal to the thickness of the washer 18 so that the peripheral edge 20 of the spacer 19 bears on the plate 10 when the under side of the spacer bears on the top surface of the washer. The upper side of the spacer 19 is provided with a recessed seat 21 into which is positioned a non-heat conducting handle 22. The handle 22 is screw tapped at 23 on its under side and is threadedly engaged with the screw 17.

The depth of the recessed seat 21 is preferably greater than the linear thermal expansion of the screw 17 when the latter is subjected to meat frying temperatures in order that expansion of the screw does not permit movement of the handle 22 in a horizontal plane relative to the plate 10.

Figure 3:
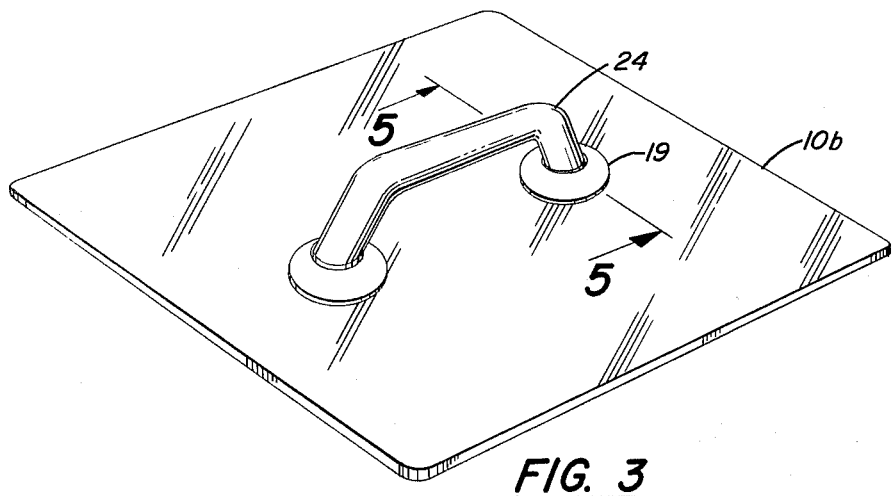
FIG. 3 is a perspective view of a meat frying cover with an alternative form of handle utilizing features of the invention.
Figure 5:
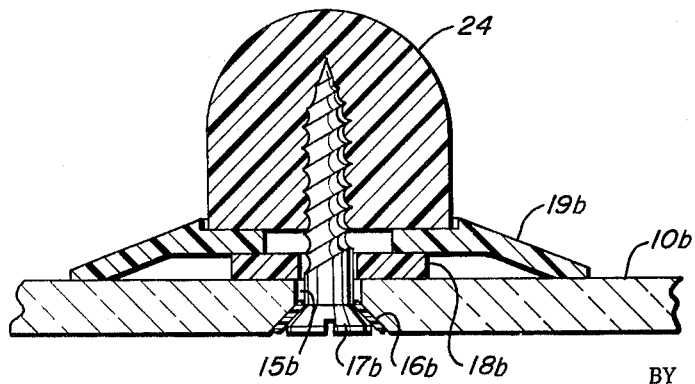
FIG. 5 is a sectional view of said alternative form of handle taken along the line 5—5 of FIG. 3.

FIGURE 3 illustrates a handle assembly which is secured at two positions on the cover 10b. Referring specifically to FIG. 5 a structure similar to FIG. 4 is shown except that the handle 24 requires two spaced holes 15b in the plate 10b; one of which is shown, in cross section, in FIG. 5. Similarly at each hole 15b there would be required a grommet 16b, a screw 17b, a resilient washer 18b, and a spacer 19b.

The handle assembly such as 11 of the invention is essentially rigid but with a small degree of resiliency. Downward pressure on the handle 22 causes the latter to compress the resilient washer 18 and, simultaneously increases the pressure of the peripheral edges 20 of the spacer 19. This latter pressure causes a slight expansion of the circle defined by said edges 20. Thus, the weak point of the glass structure, the area around the hole 15 is protected by the resiliency of the washer 18 and the distribution of some of the pressure to the peripheral edges 20 of the spacer 19. As indicated previously any loosening of the handle 11 as a result of expansion of the screw 17 will not result in lateral movement of the handle relative to the plate.

The form of cover shown in FIGS. 3 and 5 is especially suited for a much larger meat cover, such as for example, a cover for a large portion or even substantially all of a large griddle. Such a cover could be square as shown, or rectangular, or oblong, and might be of relatively large size.

It is to be understood that the above specifically described embodiments constitute preferred embodiments of the invention and are used for purposes of illustration only, that the invention is not limited to the precise forms disclosed and various changes may be made therein without departing from the spirit of the invention which is defined by the following claims.

I claim:
1. A meat frying cover assembly comprising
   (1) a flat heat resistant glass plate having a top side and a bottom side, said plate being provided with at least one hole therein extending from said top side to said bottom side;
   (2) a grommet inserted in the bottom side of each said plate hole;
   (3) a non-heat conducting handle positioned on the top side of said plate, spaced from said plate, and provided with a screw tapped hole concentric with each plate hole;
   (4) a non-heat conducting annular spacer positioned at each plate hole, each said spacer being concave on its under side, positioned between said handle and said plate, positioned concentrically with a plate hole, touching said plate only at the peripheral edge of said spacer, and said peripheral edge being expandable in response to downward pressure on said spacer;
   (5) a resilient washer positioned at each plate hole, said washer being of substantially smaller diameter than said spacer, being positioned between said spacer and said plate and in the concavity of the spacer, and the thickness of said washer being substantially equal to the depth of the concavity of said spacer; and
   (6) a screw inserted in said assembly from the bottom side of each plate hole and penetrating a grommet, a hole in the plate, a washer, and being threadedly engaged with said handle.

2. The assembly according to claim 1 wherein there is one plate hole.

3. The assembly according to claim 1 wherein there are two plate holes.

4. The assembly according to claim 1 wherein there is one plate hole and wherein the upper side of the spacer is provided with a recessed seat for said handle, said seat being deeper than the change in length of said screw when said assembly is subjected to a meat frying temperature.

5. The assembly according to claim 1 wherein there are two plate holes and wherein the upper side of each spacer is provided with a recessed seat for said handle, said seat being deeper than the change in length of said screw when said assembly is subjected to a meat frying temperature.

References Cited by the Examiner

UNITED STATES PATENTS

| | | | |
|---|---|---|---|
| 760,298 | 5/1904 | Bassick | 16—121 |
| 1,597,067 | 8/1926 | Dienner | 74—553 |
| 1,974,618 | 9/1934 | Lent | 16—116 X |
| 2,157,303 | 5/1939 | Penrose et al. | 99—349 X |
| 2,536,246 | 1/1951 | Wendt | 99—349 |
| 3,148,406 | 9/1964 | Freiman | 16—121 |

FOREIGN PATENTS

| | | |
|---|---|---|
| 787,457 | 7/1935 | France. |
| 853,067 | 11/1960 | Great Britain. |

WALTER A. SCHEEL, *Primary Examiner.*

BILLY J. WILHITE, *Examiner.*